(12) United States Patent
Morbitzer et al.

(10) Patent No.: US 7,557,716 B2
(45) Date of Patent: Jul. 7, 2009

(54) METAL TUBE ASSEMBLY AND RADIO FREQUENCY IDENTIFICATION (RFID) TAG

(75) Inventors: Nelson Mario Pachao Morbitzer, Buenos Aires (AR); Hugo Alejandro Ernst, Buenos Aires (AR); Luis Roberto Heritier, Buenos Aires (AR)

(73) Assignee: Sindera Saic, Buenos Aires (AR)

( * ) Notice: Subject to any disclaimer, the term of this patent is extended or adjusted under 35 U.S.C. 154(b) by 412 days.

(21) Appl. No.: 11/490,378

(22) Filed: Jul. 20, 2006

(65) Prior Publication Data

US 2007/0018825 A1   Jan. 25, 2007

(30) Foreign Application Priority Data

Jul. 21, 2005   (AR) ............... P050103017

(51) Int. Cl.
*G08B 13/14*   (2006.01)
(52) U.S. Cl. .................... 340/572.8; 235/492
(58) Field of Classification Search ... 340/572.1–572.9, 340/10.1; 235/375–385, 492
See application file for complete search history.

(56) References Cited

U.S. PATENT DOCUMENTS

| 4,822,987 | A |   | 4/1989 | Goldenfield et al. |
| 4,912,169 | A | * | 3/1990 | Whitmire et al. ............ 525/221 |
| 4,944,856 | A |   | 7/1990 | Catanese et al. |
| 4,960,984 | A |   | 10/1990 | Goldenfield et al. |
| 4,978,917 | A |   | 12/1990 | Goldenfield et al. |
| 5,477,023 | A |   | 12/1995 | Schneider et al. |
| 5,777,303 | A |   | 7/1998 | Berney |
| 5,844,802 | A |   | 12/1998 | Lepper et al. |
| 6,016,255 | A |   | 1/2000 | Bolan et al. |
| 6,036,101 | A |   | 3/2000 | Hass et al. |
| 6,122,704 | A |   | 9/2000 | Hass et al. |
| 6,330,977 | B1 |   | 12/2001 | Hass et al. |
| 6,349,881 | B1 |   | 2/2002 | Wilkey et al. |
| 7,256,697 | B2 | * | 8/2007 | Sakama et al. ............ 340/572.8 |
| 2006/0044206 | A1 | * | 3/2006 | Moskowitz et al. ......... 343/841 |

FOREIGN PATENT DOCUMENTS

| JP | 11352243 | 12/1999 |
| JP | 2000065510 | 3/2000 |
| JP | 2003022428 | 1/2003 |
| JP | 2004245963 | 9/2004 |
| JP | 2004247090 | 9/2004 |

* cited by examiner

*Primary Examiner*—Benjamin C Lee
*Assistant Examiner*—Ojiako Nwugo
(74) *Attorney, Agent, or Firm*—Volpe and Koenig, P.C.

(57) ABSTRACT

An assembly of metal tube and radio-frequency identification (RFID) labels is provided. RFID labels are attached to the external surface of a tube and are placed at a distance less than 1 mm from the external surface.

18 Claims, 2 Drawing Sheets

METAL TUBE ASSEMBLY AND RADIO FREQUENCY IDENTIFICATION (RFID) TAG

FIELD OF THE INVENTION

This patent refers to an assembly of metal tube and radio-frequency identification (RFID) labels applied on said tube.

BACKGROUND OF THE INVENTION

There currently exists an increasing interest in the tracking of serial manufactured metal tubes, not only as regards the internal tracking within the premises but also after such tubes are delivered. There exists a large variety of identification and tracking methods which involve printing of symbols (numbers, bar codes, brands, etc.,) by means of electrolytic attack, machining, laser, identification bands, releasable labels, electronic cards or modules, which may be implanted inside or outside the metal tube.

However, codes printed on a metal surface become eventually useless due to the deterioration of identification marks, which become dirty or are deleted until they disappear, rendering viewing thereof difficult. At present there do not exist durable prints on metal tubes, due to the harsh conditions of tubes manufacturing processes, transport requirements and extended exposures to humidity and other environmental conditions. The above applies both to pipeline and casing tubes. As regards tubes intended for production tubings, same may be reused, and thence more durable marks will be required, which marks should also support wells operative conditions, namely temperature, hydrocarbons and aqueous solutions presence, etc.

Also, electronic identification methods are widely used at present with the purpose of tracking and identifying personal articles, serial products, mail, animals, baggage, wastes, etc. These electronic methods employ devices including an integrated circuit in order to transport information corresponding to the article one wishes to track.

Particularly, in the case of tubes manufacturing, radio frequency identification (RFID) technology would not only provide tubes identification but also data storage and reading capacity without the need of contacting tubes. Data storage allows tracking of those characteristics specifically pertaining to processes and manufacturing.

It is known that these kind of structures are subject to adverse conditions during handling, transport and use, and thence it is required a high performance identification system, particularly in the case of hostile well operation conditions (high temperature, exposure to solvents, hydrocarbons, hot aqueous solutions, etc.). Further, as metal tubes could be used for other services after their use in wells, a durable identification technology is needed, able to store data throughout the life of the metal tube.

Documents JP 11352243, JP 2000065510 and JP 2003022428 disclose a detection element which is buried along with a metal body, said detection element including a radio frequency identification (RFID) circuit which is attached to the external surface of said metal body by means of an adhesive tape, said detection element including an electromagnetic screen between said metal body and said RFID circuit. The purpose thereof is to accurately identify a metal body, such as a metal tube, without variations of the resonance frequency which is sent from the identification device, which activates a radio frequency identification (RFID) circuit and Q gain of a coil, even when the identification device is fully attached to the metal body.

Document JP 2004245963 discloses a long tube within which a large number of cables pass through, said tube including a plurality of radio frequency identification (RFID) labels, said labels being suitable spaced along said tube, in order to easily and accurately identify a single certain cable among a plurality of cables. As the identification labels are located within the tube body, their heat resistance is higher, and labels are not affected by external temperatures.

Document JP 2004247090 discloses a hollow tubular body intended to accommodate cables, said tubular body being able to store a large quantity of information regarding the cable, without such stored information becoming indistinguishable in the course of time. Said elongated body comprises a plurality of radio frequency identification (RFID) labels which are spaced from each other a predetermined distance along said body.

Other documents such as U.S. Pat. No. 4,822,987, U.S. Pat. No. 4,944,856, U.S. Pat. No. 4,960,984, U.S. Pat. No. 4,978,917, U.S. Pat. No. 5,477,023, U.S. Pat. No. 5,777,303, U.S. Pat. No. 5,844,802, U.S. Pat. No. 6,016,255, U.S. Pat. No. 6,036,101, U.S. Pat. No. 6,122,704, U.S. Pat. No. 6,330,977 and U.S. Pat. No. 6,349,881 refer to the identification and tracking of metal tubes by means of other detection elements such as for instance laser identification labels or bar codes, printing by chemical attack, by etching, semi-conductive integrated circuits attached by means of probes, electronic cards and the like.

As previously mentioned, durability of the above identification and tracking devices is very limited, due to the environmental hostility once tubes are delivered from the manufacturing plant, because of storage, handling, transport and use in wells; reading of said identification elements being further susceptible of being affected by the electromagnetic shielding generated by metal tubes on which such elements are fixed. On the other hand, in those cases in which an electromagnetic screen or shield is used in order to attenuate said shielding effect, the identification element becomes voluminous, it being then subject to transport and handling risks as already mentioned.

Thus, it is necessary to create a device for the identification of metal tubes from the manufacturing plant to the end of the life of said tubes, such device being capable of solving all of the art problems known up to this day. It is also necessary to be able to store and retrieve data pertaining to such tubes, including evolution thereof throughout their life.

SUMMARY

Accordingly, the present invention is based on the radio frequency identification (RFID) labels technology for the identification and tracking of metal tubes. Said labels may be read through a wide variety of substances such as snow, fog, ice, paint or other similarly discouraging environmental conditions which render bar codes and other optical reading technologies useless. Further, radio frequency identification (RFID) labels may be read at very high speed in changing situations, at most at less than 100 milliseconds. While being a technology which is more expensive than that of bar codes, the radio frequency identification technique can be considered indispensable for a wide range of automated data collection and identification applications which would otherwise be impossible to attain. There exists a wide variety of radio frequency identification (RFID) equipment which include different variants of identification labels and measuring apparatuses. RFID technology basically consists of three elements:

1) an antenna;
2) a transmitter-receiver (with decoder); and
3) a radio frequency identification (RFID) label, electronically programmed with a certain information.

The antenna emits radio signals in order to activate, write and read data from said label. Antennas are communication routes between label and transmitter-receiver, and control the acquisition and transfer of system data. The antenna, transmitter-receiver and decoder are generally housed in the so-called measuring equipment. The later may be configured as a portable or fixed equipment. Measuring equipment emits radio signals within a set frequencies range, and when the label passes through the electromagnetic zone generated by the equipment, the label detects said activation signal and emits a response. The equipment receives said signal and decodes data from the label integrated circuit, and sends the information so obtained to a processor for the analysis thereof.

Once the label contacts the metal surface, the electric frequency of the label should be reciprocally adjusted and defined with a reader in order to provide an accurate signal acknowledgement. Frequencies employed in the present invention range from 100 KHz to 10 MHz.

Separation between metal surface and label should also be optimized in order to avoid electromagnetic shielding effects from reader. The object is to obtain the smaller possible separation so as to prevent normal handling of tubes from being affected in the manufacturing plant, during transit or end use thereof, while still allowing labels reading. Another object is to reduce the flow resistance produced by the identification element around the tube. In other words, fluids flowing conditions around the tube should be modified as little as possible.

Label may be attached to tube by different elements. Said elements purpose is also to protect label from friction, impact, release forces, environmental conditions or the like. In other words, different attachment means will protect labels from the different effects generated by tubes manufacturing, storage, handling, transportation and commissioning processes.

Where use conditions are most severe, such as in the case of those tubes intended for well environments, attachment elements should not degrade easily. Said elements should be resistant to solvents, hydrocarbons, high temperature, acids or combinations thereof.

Attachment means may be selected from thermo-shrinkable polymeric bands, adhesive tapes, plastic material rings molded on tube surface, or adhesives attaching and encapsulating labels. When so desirable (e.g. in the case of molded plastic rings and adhesives) label may be placed within a recess machined on the surface of the tube, so that the whole label or a part thereof remains below such surface.

Attachment means selected according to each particular application should assure an adequate resistance against already mentioned environmental efforts and factors. Accordingly, attachment means for well uses may include options such as plastic molded rings made of epoxy resin or PPS (polyphenylene sulfide), or those adhesives which exhibit an excellent chemical and mechanical strength such as epoxy adhesives.

Tracking of metal tubes through radio-frequency identification technology (RFID) may be divided in two parts:
1) Tracking from manufacturing plant to well hole:
   a flexible label is attached to tube surface my means of a thermo-shrinkable blanket, plastic ring or adhesive tape covering label;
2) Tracking from well to the end of tube life:
   labels are encapsulated or adhesivated on the external surface of tube, which may be the cylindrical or upset regions, where recesses are machined in order to house or encapsulate labels. Another possible solution for this kind of application is the utilization of a molded plastic ring which attaches, covers and protects said labels.

Accordingly, it is an object of the present invention an assembly of metal tube and radio-frequency identification (RFID) labels, wherein said labels are attached to the external surface of said tube, and wherein the distance thereof from said external surface is smaller than 1 mm.

BRIEF DESCRIPTION OF THE DRAWINGS

There follows a brief reference to the different figures which illustrate the object of this invention.

DETAILED DESCRIPTION OF THE PREFERRED EMBODIMENTS

Figure 1A:
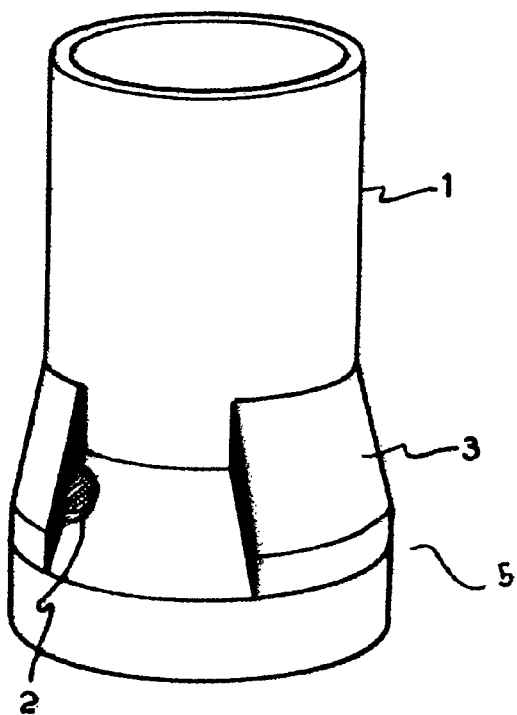
FIG. 1A illustrates a portion of a metal tube including a radio-frequency identification (RFID) label placed on the conical upset region of tube.

FIG. 1A illustrates a portion of a metal tube 1 which includes an radio-frequency identification (RFID) label 2 on the conical upset region 5 of tube 1. Said label 2 is surrounded by an attachment means such as for example a molded plastic ring 3 which may be injection-molded (when made of thermo-plastic material), casted or made by reaction injection (when made of thermo-rigid material), in such a way that it firmly fixes said label 2 on said metal tube 1. A thermo-shrinkable blanket (not illustrated) could be also used instead of said molded plastic ring 3.

Figure 1B:
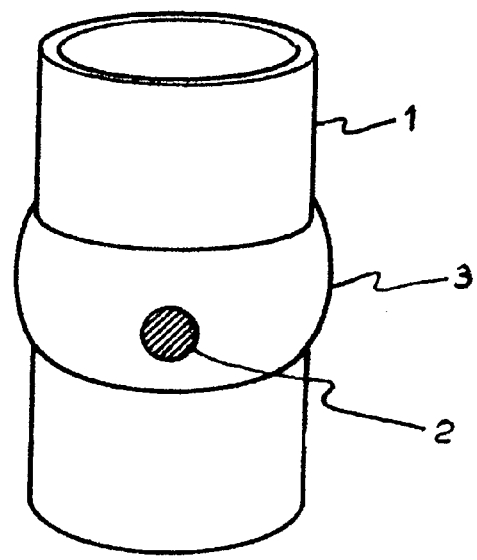
FIG. 1B illustrates a portion of a metal tube including a radio-frequency identification (RFID) label placed on the cylindrical region of the tube.

FIG. 1B illustrates the same molded plastic ring 3 which includes a label 2, but placed on the cylindrical region of tube 1.

Labels 2 may form a single structure with the different attachment means. In such case same may be included when molding plastic ring 3.

Molded plastic ring 3 may be thermo-plastic or thermo-rigid, with good mechanical properties and an excellent chemical resistance against the environment in which tube shall operate during its life. Where the ring is made of thermo-plastic material, it shall be made by injection-molding, while if said ring is made of thermo-rigid material, molding shall be by simple casting on a heated mold, or by means of reaction injection molding (RIM). This solution would protect labels 2 from impact forces, and thence life thereof would be extended.

Another alternative is to use an adhesive tape (not illustrated) as sole attachment means for labels 2. The tape being the only attachment means, it should exhibit high mechanical resistance and high peel resistance, more specifically it should exhibit a good adhesion at temperatures ranging from −44° C. and 66° C. (−47.2° F.-150.8° F.). However, the sole presence of an adhesive tape could not afford an adequate mechanical protection to labels 2. Thus, it could be later included over said adhesive tape a thermo-shrinkable blanket (not shown), or a molded plastic ring 3, both with the purpose of improving mechanical protection of labels 2 and attachment thereof to external surface of tube 1.

As already mentioned, labels 2 may also be included within the structure of the adhesive tape during the manufacturing of said tape.

Figure 2A:
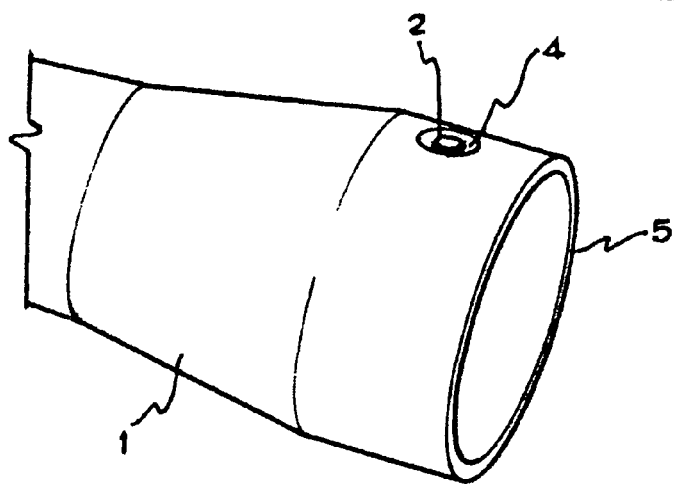
FIG. 2A illustrates a radio-frequency identification (RFID) label placed within a recess on the upset cylindrical region of a tube, which label is attached by means of the encapsulation thereof with an adhesive (see FIG. 3).
Figure 3:
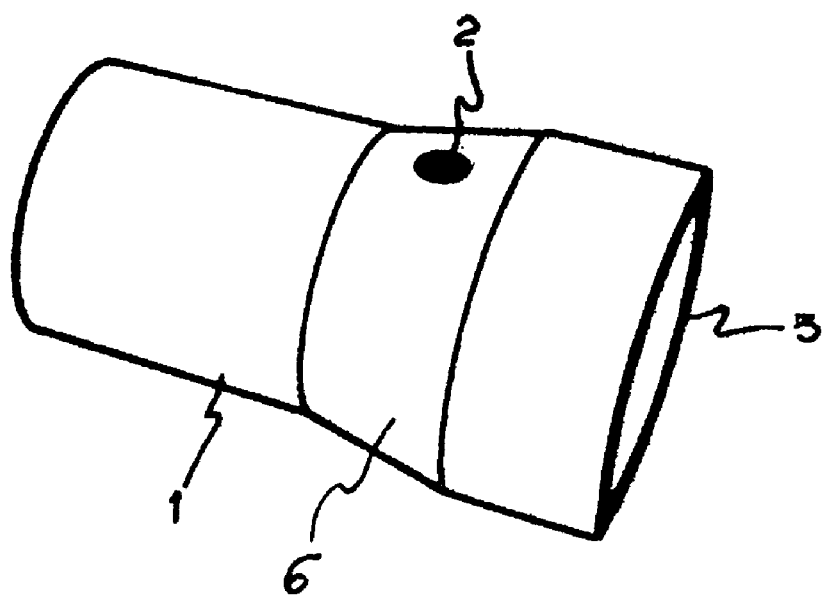
FIG. 3 illustrates a radio-frequency identification (RFID) label which is attached to the external surface of the conical region of a metal tube 1 by means of an adhesive which forms an encapsulation over the label and at the same time it copies the shape of said external surface.

FIG. 2A illustrates the position of a label 2 within a recess 4 of upset 5 of external cylindrical surface of tube 1, over which label 2 is encapsulated by means of an adhesive (see FIG. 3). Geometry of said recess 4 should be selected in such a manner to concentrate the lowest possible amount of tension, and also, with a minimum weakening of the machined area. Recess 4 should be machined on upset 5 of the end of tube 1 at a distance of at least 5 mm from where the thread begins.

Figure 2B:
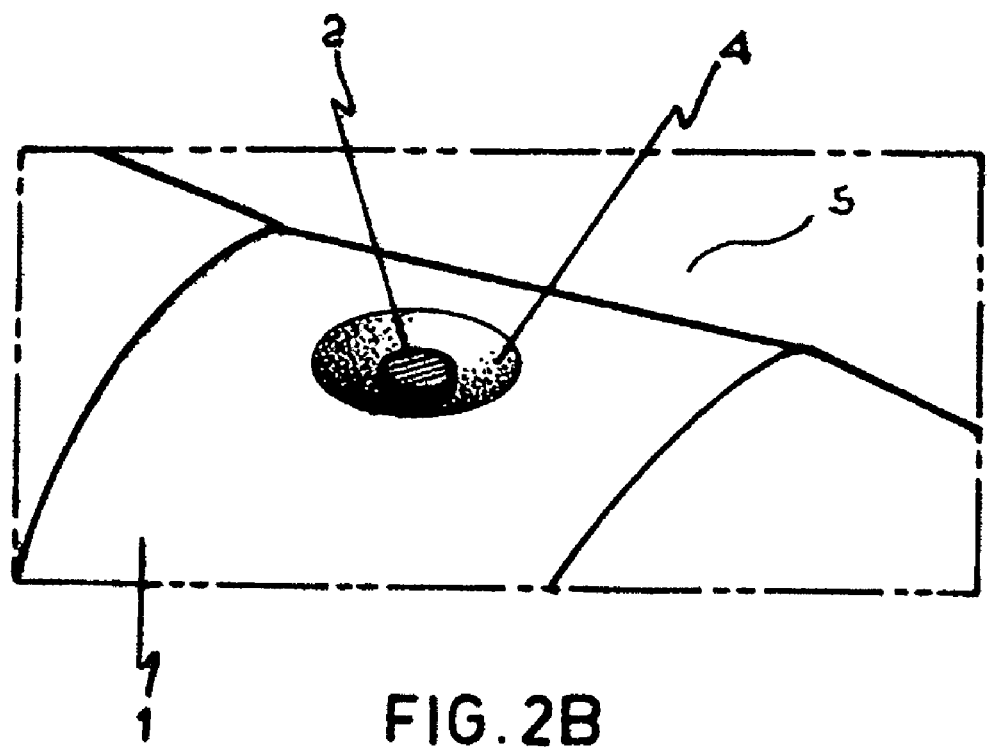
FIG. 2B illustrates a radio-frequency identification (RFID) label placed within a recess on the upset conical region of a tube, which label is attached by means of the encapsulation thereof with an adhesive (see FIG. 3).

FIG. 2B illustrates the position of a label 2 within a recess 4 of upset 5 of conical surface of tube 1, over which label 2 is encapsulated by means of an adhesive (see FIG. 3).

As regards what has been disclosed by FIGS. 2A and 2B, it is desirable for the adhesive (not shown) to form an encapsulate due to the following:

- to avoid tube corrosion. Formation of dead areas or cavities inhibiting fluid circulation should be prevented. Presence thereof may originate corrosion phenomena;
- to reduce flow resistance. Surface irregularities produce an increased resistance against fluids passage; and
- to reduce adhesive degradation rate. A correct encapsulation reduces the adhesive-fluid interface area, delaying phenomena related to the diffusion of fluid molecules into the adhesive volume.

FIG. 3 illustrates attachment of label 2 to external surface of a metal tube 1 by means of adhesive 6 which encapsulates same, and which must also copy the shape of said external surface, as illustrated by FIGS. 2A and 2B. Said adhesive should have a chemical and thermal strength according to the environment in which tube 1 is to be used.

Read-only type labels 2 may be used for identification purposes on tubes 1. If so, information stored by labels 2 will consist of a number not related to tube 1. This number will provide entering to a database storing information corresponding to each tube 1. This number will be read once label 2 is placed on tube 1, and shall be associated to the registry of the database which stores information about tube 1 which bears label 2. Should it be deemed desirable, a plurality of labels 2 may be used for the identification of a single tube 1, which labels may be distributed along the length of the tube or the perimeter thereof. Where more than one label 2 is to be used in order to identify one tube 1, the different numbers of each of said labels 2 should be associated to a same register of the database which includes tube 1 information. Reading of different labels 2 will allow results crossing and accordingly, checking of collected information. Quantity of labels 2 and spacing between them will depend on the product to be identified. Determination of such variables is within the scope of any person of ordinary skill in the art.

Another possibility is to use labels 2 which allow data reading and writing. In this case, information to be registered in each label 2 should be related to tube 1 to which label 2 is attached. Depending on the memory capacity of label 2, information to be registered may consist in any number associated to tube 1, product kind, different properties thereof, or even the result of inspections carried out during working life of tube 1. Information shall be registered before tube 1 exits from the manufacturing plant and may be later modified in full or in part. Should it be deemed desirable, a plurality of labels 2 may be attached for the identification of a single tube 1, which labels may be distributed along the length of the tube or the perimeter thereof. Where more than one label 2 is to be used in order to identify one tube 1, the information to be registered in the different labels 2 should be coincident. Reading of the different labels 2 will allow comparison of results, and thence to check the collected information. Quantity of labels 2 and spacing between them will depend on the product to be identified. Determination of such variables is within the scope of any person of ordinary skill in the art.

As regards distance of label 2 to external surface of tube 1, such distance should be minimal so as to produce the lowest variation on tube 1 geometry. We have empirically established that a distance smaller than 1 mm, more preferably smaller than 0.1 mm, is enough in order to obtain an adequate reading without shielding effects of metal against the emitted radio-frequency signal, which fact defines a reading distance—or from reader to label 2—larger than 4 cm, which will depend from the antenna dimensions, output of transmitting unit, operation frequency and separation as regards tube 1.

The invention claimed is:

1. An assembly of metal tube and radio-frequency identification (RFID) labels, wherein the labels are attached to an external surface of said tube and are placed at a distance less than 1 mm from said external surface within a recess on an upset conical or upset cylindrical region of an end of said tube, said recess being at a distance of at least 5 mm from a beginning thread of the tube.

2. The assembly according to claim 1, wherein the distance from the external surface is less than 0.1 mm.

3. The assembly according to claim 1, wherein a reading distance or a distance of a reader from labels is greater than 4 cm.

4. The assembly according to claim 1, wherein a reading frequency for said labels ranges from 100 KHz to 10 MHz.

5. The assembly according to claim 1, wherein a plurality of labels are arranged along a length of the tube or a perimeter thereof, said labels exhibiting an appropriate spacing between them.

6. The assembly according to claim 1, said wherein attachment of said labels to the external surface of tube is carried out by attachment elements.

7. The assembly according to claim 6, wherein the attachment elements are selected from the group consisting of: an adhesive, a thermo-shrinkable blanket, an adhesive tape and a molded plastic material ring.

8. The assembly according to claim 6, wherein said labels are included within a structure of said attachment means during manufacturing thereof.

9. The assembly according to claim 6, wherein said attachment elements avoid affecting normal handling of tube in a manufacturing plant, during transit or during end use.

10. The assembly according to claim 6, wherein said attachment elements reduce flow resistance produced by a presence of said labels around the tube.

11. The assembly according to claim 7, wherein said adhesive exhibits a chemical and thermal strength according to an environment in which said tube is to be used.

12. The assembly according to claim 11, wherein said adhesive both forms an encapsulation on said labels and copies an external shape of the external surface of said tube.

13. The assembly according to claim 7, wherein said thermo-shrinkable blanket is heat-shrunken in such a way that it fits around the external surface of said metal tube.

14. The assembly according to claim 7, wherein said adhesive tape exhibits good tensile strength and high peel strength, and retains good mechanical properties at temperatures ranging from −44 to 66° C. (−47.2° F.-150.8° F.).

15. The assembly according to claim 14, wherein said adhesive tape is the only attachment means of said labels to the surface of tube.

16. The assembly according to claim 14, wherein said adhesive tape is surrounded by a band of said thermo-shrinkable material or by said molded plastic material ring.

17. The assembly according to claim 7, wherein said molded plastic material ring is of thermo-plastic or thermo-rigid character, it exhibits good mechanical properties and an excellent chemical strength against an environment within which tube is to operate during its life.

18. The assembly according to claim 17, wherein if said molded plastic material ring is made of thermo-plastic material it is injection-molded, while if said ring is made of thermo-rigid material, it is made by casting in a heated mold or by means of reaction injection molding (RIM).

* * * * *

UNITED STATES PATENT AND TRADEMARK OFFICE
CERTIFICATE OF CORRECTION

| | | |
|---|---|---|
| PATENT NO. | : 7,557,716 B2 | Page 1 of 1 |
| APPLICATION NO. | : 11/490378 | |
| DATED | : July 7, 2009 | |
| INVENTOR(S) | : Morbitzer et al. | |

It is certified that error appears in the above-identified patent and that said Letters Patent is hereby corrected as shown below:

Title Page,
At section (73) Assignee, delete "SINDERA SAIC" and insert therefor --SIDERCA SAIC--

Signed and Sealed this

Fourteenth Day of December, 2010

David J. Kappos
*Director of the United States Patent and Trademark Office*